Aug. 19, 1958   L. K. SPINK   2,847,850
FLUID DENSITY MEASUREMENT DEVICE
Filed Aug. 26, 1955   4 Sheets-Sheet 3
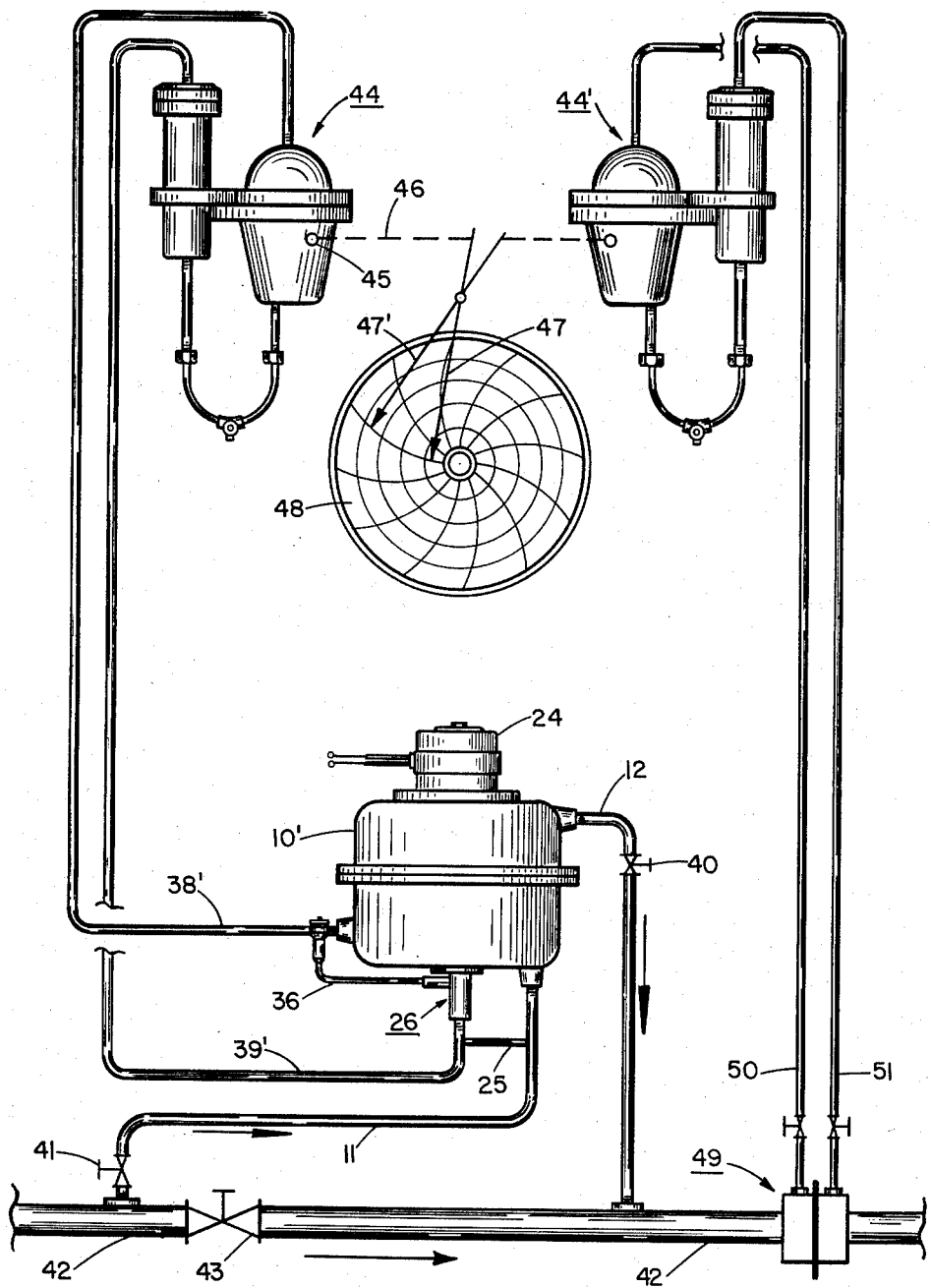
FIG. III
INVENTOR.
LELAND K. SPINK
BY
Lawrence H. Paeton
AGENT Aug. 19, 1958  L. K. SPINK  2,847,850
FLUID DENSITY MEASUREMENT DEVICE
Filed Aug. 26, 1955  4 Sheets-Sheet 4
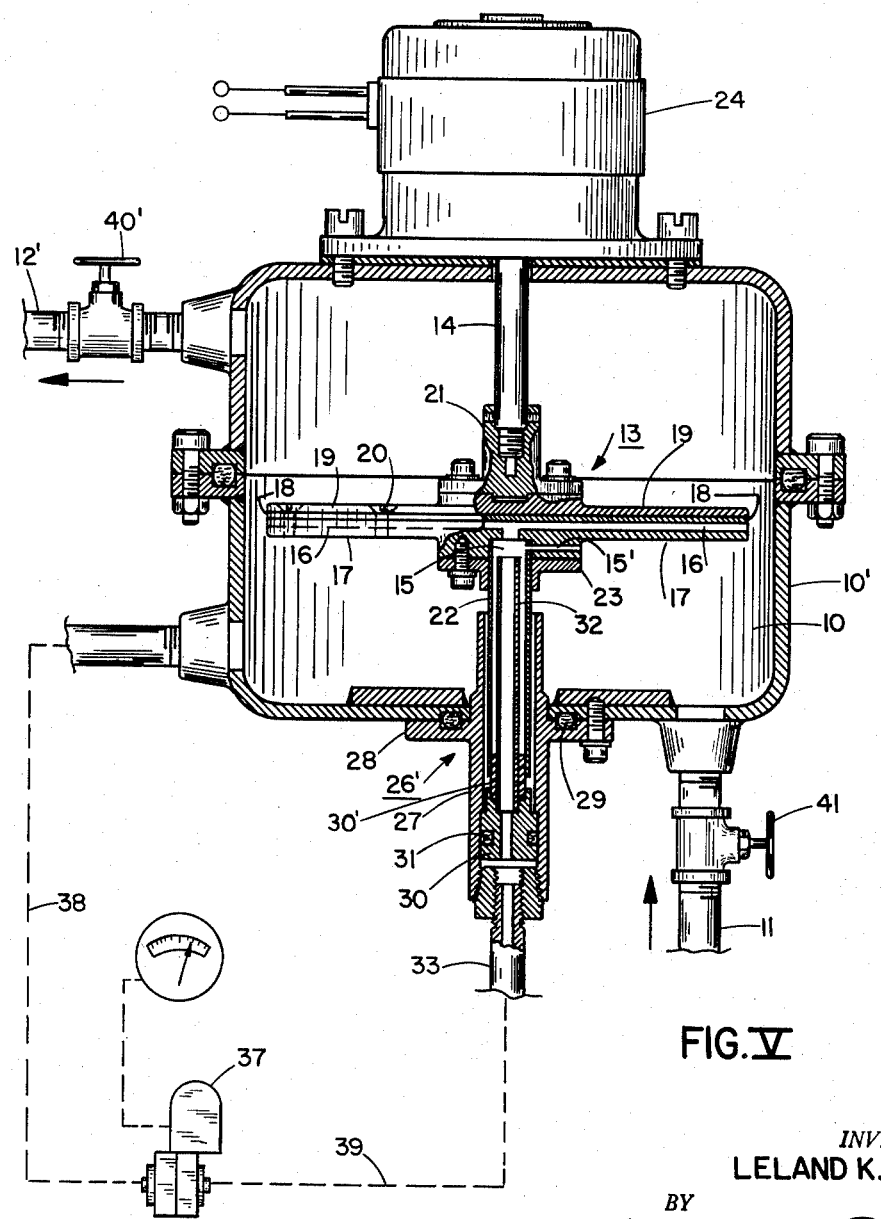
FIG. V
INVENTOR.
LELAND K. SPINK
BY
Lawrence H. Paeton
AGENT United States Patent Office 2,847,850
Patented Aug. 19, 1958

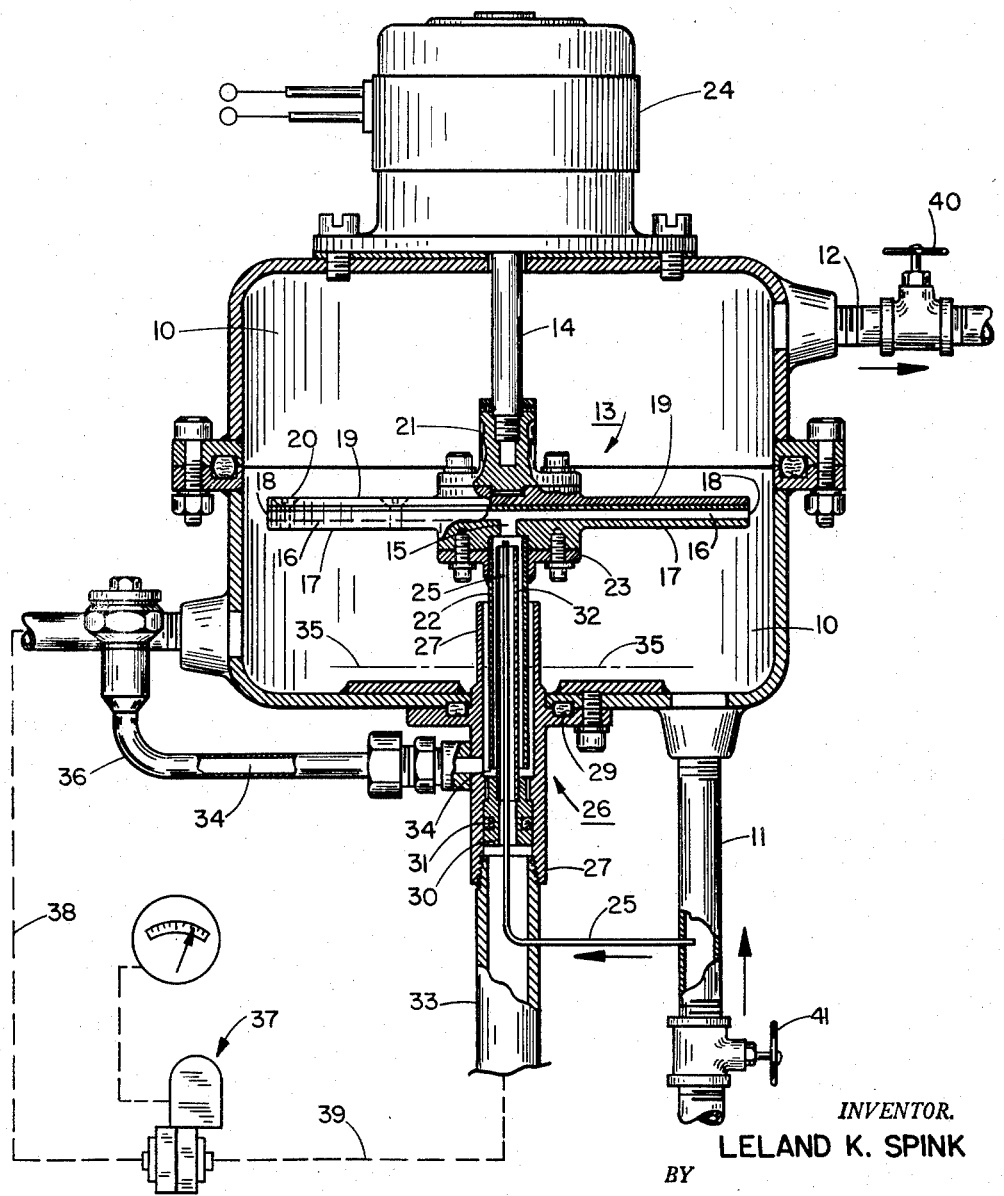

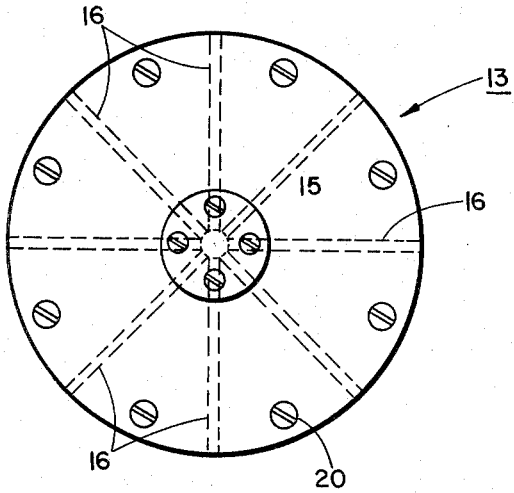
FIG. II
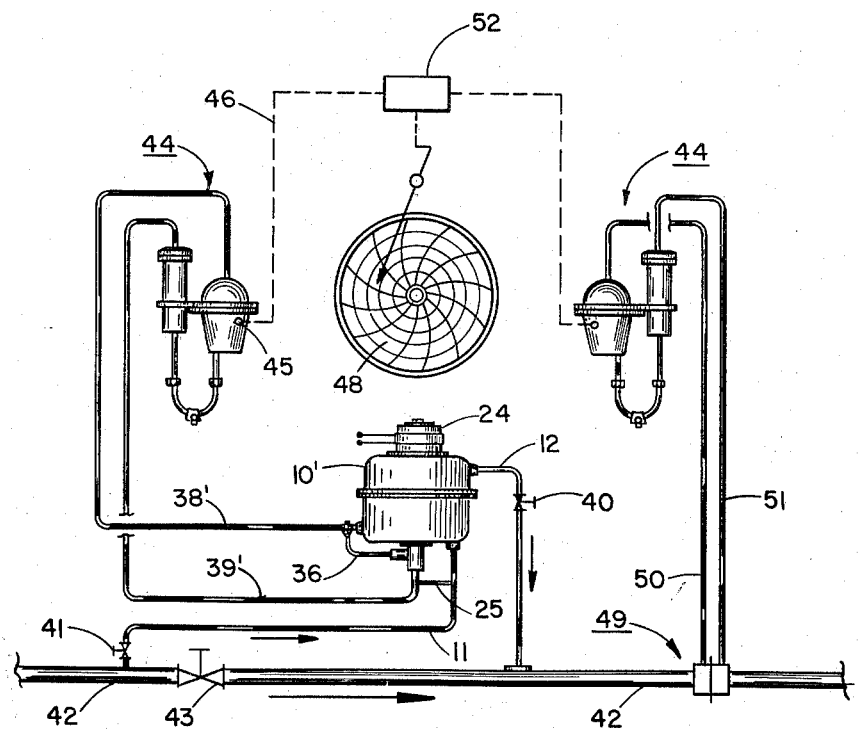
FIG. IV

2,847,850

FLUID DENSITY MEASUREMENT DEVICE

Leland K. Spink, Foxboro, Mass., assignor to The Foxboro Company, Foxboro, Mass., a corporation of Massachusetts Application August 26, 1955, Serial No. 530,714

1 Claim. (Cl. 73—30)

This invention relates to apparatus for measuring fluids and has particular reference to apparatus for measuring the density of fluids independently or in association with fluid flow measuring apparatus.

This invention is concerned with a fluid density measuring arrangement of the type which uses a centrifugal fluid impeller unit, and is further concerned with an association of fluid density and flow measurement apparatus.

In this invention, a fluid sample enclosure is used, with a centrifugal fluid impeller therein, with means for supplying a fluid sample directly to the enclosure, and with means for supplying a fluid sample indirectly to the enclosure, by way of the impeller, to provide a pressure differential between the enclosure fluid sample and the impeller fluid sample as an indication of the density of one of the samples.

Also, in this invention, a density measurement and a flow measurement may be associated in such a manner as to provide density and flow measurement representations which may readily be related.

It is an object of this invention to provide a new and improved device for measuring the density of fluids.

Another object of this invention is to provide such a device in association with flow measuring apparatus.

Other objects and advantages of this invention will be in part apparent and in part pointed out hereinafter and in the accompanying drawings wherein:

Figure I is a showing of a density measuring device according to this invention, generally in central vertical section;

Figure II is a plan view of the centrifugal impeller disc shown in Figures I and V;

Figure III is an illustration of a measurement device according to this invention, with a density measurement arrangement shown in association with a flow measurement arrangement;

Figure IV is an illustration of a measurement device like that of Figure III, with a density measurement arrangement in an alternate association with the flow measurement arrangement; and Figure V is a showing of a "static" sample density measuring device according to this invention.

As an illustrative embodiment of this invention the following specification refers to a gas measurement device as an example of a fluid measurement.

The Figure I gas density measuring device comprises an enclosed gas sample chamber 10 which is generally cylindrical. The chamber 10 is formed by a housing 10' and is provided with a gas sample inlet pipe 11 and a gas sample outlet pipe 12. Thus a continuous flow of sample gas may be provided through the chamber 10, and the continued operation of the device provides a continuous density measurement which is related to the density of the gas flowing through the chamber 10.

Within the chamber 10 a centrifugal gas impeller disc unit 13 is centrally and horizontally mounted, on a vertically depending drive shaft 14, for rotation about its center and the axis of the shaft 14. As illustrated in the plan view of Figure II, the disc unit 13 is provided with a central passage portion 15, and radial passages 16 from the central passage portion 15 to the periphery of the disc unit 13 and opening to the sample chamber 10. Thus, as the disc unit 13 is rotated, gas in the radial passages 16 is impelled radially outwardly by centrifugal force, causing a pressure reduction in the area of the central passage portion 15. As will be discussed hereinafter, this pressure reduction provides a differential pressure, with respect to the gas pressure in the sample chamber 10, which is a measure of the density of the gas in the impeller passages.

In the device shown in Figure I, the centrifugal gas impeller disc unit 13 is made up of a bottom disc 17, with radial grooves in the top thereof to form the basis of the radial passages 16. A disc gasket 18 covers the top of the bottom disc 17, and covers the radial grooves thereof to form radial passages 16. A top disc 19 covers the top of the gasket 18, and whole disc unit 13 is held together by a series of screws 20 adjacent the periphery of the disc unit. The top disc 19 is secured to the depending drive shaft 14 through a rigid coupling 21, and an axially depending sleeve 22 is rigidly secured to the under side of the bottom disc 17 by a bolted plate 23 to which the upper end of the sleeve 23 is secured, as by welding or brazing.

The impeller unit 13, through the depending shaft 14, is rotatably driven at a constant sped by an electric motor 24, mounted outside of the sample chamber 10 and on top of the chamber enclosure. The mounted end of the motor 24 is closed off and the shaft 14 extends through the wall of the chamber (10) enclosure. With this arrangement, and since the motor 24 is not enclosed, the heat from the motor is well dissipated in the surrounding atmosphere and has negligible effect on the sample gas in the chamber 10. When the electric motor 24 is operated the entire centrifugal impeller disc is rotated, that is, the shaft 14, the impeller disc unit 13, and the depending sleeve 22, are all rotated together.

In Figure I, further, from the sample chamber inlet pipe 11 to the central passage portion 15 of the impeller disc unit 13, a relatively small pneumatic passage tube 25 is provided, as a means of introducing a portion of the gas from the inlet pipe 11 into the impeller disc unit 13.

The impeller inlet tube 25 and the depending sleeve 22 from the impeller disc 13 are in a fixed length telescoping, relative rotation relation with each other as a part of a telescoping assembly 26 which extends through the bottom of the enclosure 10.

The telescoping assembly 26, as will be described hereinafter, is used to introduce sample gas into the impeller unit 13; to provide a take-off for pressure measurement from the impeller disc central passage portion 15; and to provide a seal in the telescoping assembly 26.

The outer portion of the telescoping assembly 26 is a sleeve 27 which extends through the bottom of the enclosure 10 in axial alignment with the impeller disc assembly comprising the drive shaft 14, the disc unit 13, and the depending sleeve 22. The outer sleeve 27 is provided with an outer annular flange 28 which is secured to the bottom wall of the enclosure 10, being sealed with respect thereto by an O-ring gasket 29.

The outer sleeve 27 contains the lower portion of the depending sleeve 22 in spaced radial relation therewith, and a plug assembly comprising a sealing plug 30 in close fitting relation in and with the outer sleeve 27 below the depending sleeve 22 and sealed with respect to the outer sleeve 27 by an O-ring gasket 31 and a pressure take-off sleeve 32 in effectively integral assembly with the sealing plug 30. The pressure take-off sleeve 32 is substantially less in diameter than the sealing plug 30 and extends upward therefrom, within the depending sleeve 22 and the outer sleeve 27, to a point adjacent the impeller dics central passage portion 15.

The previously mentioned impeller inlet tube 25 extends from inside the gas sample inlet pipe 11 to and into a pipe 33, which is connected to the lower end of the outer sleeve 27, and then upwardly through the sealing plug 30 and the pressure take-off sleeve 32, to terminate adjacent the impeller disc central passage portion 15, just above the top end of the pressure take-off sleeve 32.

Thus the depending sleeve 22, which rotates with the impeller disc 13, contains, without engagement therewith, the pressure take-off sleeve 32 and the impeller inlet tube 25; and is contained, also without engagement, by the outer sleeve 27. As a sealing arrangement between the gas in the chamber 10 and the impeller inlet and pressure take-off systems, a body of mercury 34 is introduced between the outer sleeve 27 and the depending sleeve 22 and between the depending sleeve 22 and the pressure take-off sleeve 32, to a level 35 below the tops of both the outer sleeve 27 and the pressure take-off sleeve 32. The mercury 34 is supplied from a "head" of mercury in a side pipe 36 with a closed outer end and an inner end open to the mercury body in the telescoping assembly 26.

The plug 30 and its O-ring gasket 31 prevents the mercury body 34 from escaping from the bottom of the telescoping sleeve system 26. Thus the impeller inlet fixed tube 25 and the pressure take-off fixed sleeve 32 are led respectively to and from the central passage portion 15 in the rotating impeller disc unit 13 in sealed relation with respect to the surrounding sample gas in the chamber 10, except for the connection through the impeller passages 16.

For a differential pressure measurement which is representative of the density of the gas being measured, as indicated at the lower left of Figure I, a differential pressure measuring device 37 is shown by way of illustation. This device may be of the type described in Patent 2,539,892, issued January 30, 1951 to L. Cook. The gas sample pressure in the chamber 10 is applied to one side of this device through a pneumatic connection indicated by the dotted line 38, and the centrifugally reduced pressure in the impeller unit 13 is applied to the other side of this device through the pressure take-off sleeve 32 and a pneumatic connection indicated by the dotted line 39.

In the continuous density measurement operation of the Figure I density measuring device, a gas sample flow is provided through the pipe 11, into and through the sample chamber 10, and out through the outlet pipe 12. As a means of controlling this outlet flow, a restrictor valve 40 may be used. The input flow in the pipe 11 may also be controlled as desired, by means of a restrictor valve 41.

As the centrifugal disc 13 is rotated at a constant speed by the motor 24, gas is "thrown" radially outward along the impeller disc passages 16, thus producing a reduced pressure area in the impeller disc central passage portion 15, and also along the passages 16 in varying degree. This reduced pressure in effect draws more gas into the impeller through the inlet tube 25, and also is available, through the reduced pressure take-off tube 32, for application to one side of the differential pressure measuring device 37.

The gas sample in the chamber 10 is at the pressure and temperature of the gas source from which it is taken, for example, a meter line, and the density measurement is consequently a true one, since the only operative change is in pressure differential due to centrifugal force on the gas in the centrifugal disc 13. Such pressure and possibly temperature build up that may occur because of this centrifugal action, near or at the peripheral openings of the centrifugal disc passages 16 is not very great, since the volume of gas passing through the passages 16 is not large. Further, the impeller disc periphery is spaced substantially from the walls of the sample chamber 10 and the volume of the gas sample in the chamber 10 is large with respect to the volume of the gas in the passages 16. As a result, any gas pressure or temperature change in the impeller disc passages is quickly dissipated in the gas in the sample chamber 10, and as a practical matter has no effect thereon. Further, turbulence is at a minimum because the disc 13 is provided with circular form and smooth surfaces.

Figure III illustrates the density measuring device of Figure I in one form of association with a flow measuring arrangement. In this Figure III structure, a gas meter pipe line 42 is shown, with the density measurement input pipe 11 leading therefrom, through the valve 41 and into the main gas sample chamber in the housing 10'. The gas sample outlet pipe 12 is connected back to the meter line 42, downstream with respect to the input pipe (11) connection. A restrictor valve 43 in the meter line also usable as a flow adjustment device to assure a sufficient flow through the gas sample by-pass comprising the input pipe 11, the density measuring device, and the outlet pipe 12.

The Figure III density differential pressure is applied, through pipes 38' and 39', to a conventional mercury manometer U-tube arrangement 44, whose output is a rotary shaft 45, shown endwise in the drawing. The density differential pressure is expressed in terms of rotation of the shaft 45, and this rotation is applied, through a connection 46, to a pen arm 47 for forming a record on a rotatable chart 48. These movements and records may be suitably calibrated in a conventional manner to provide a chart reading in terms of differential pressure, or density.

The Figure III structure is further provided, downstream along the meter line 42 with respect to the density measuring arrangement, with a flow measuring conventional orifice plate unit 49. Suitable pressure tap pneumatic connection pipes 50 and 51 are stemmed from the orifice plate unit 49 and lead to a second mercury manometer arrangement 44'. The measurement thus obtained is applied to a second pen arm 47' to provide a second record on the chart 48, in close association with the density measurement record thereon. Here, again, suitable conventional calibration arrangements may be made, as desired.

Figure IV illustrates the density measuring device of Figure I in another form of association with a flow measuring arrangement. This structure is essentially the same as that of Figure III, except that the outputs of the mercury manometers 44 and 44' are joined through a linkage arrangement at 52, with the result that a single, joint record is produced on the chart 48 by a common pen 53. A compensating linkage of the type generally suitable for this purpose is described in Patent 2,107,632 issued February 8, 1938 to W. W. Frymoyer.

Figure V illustrates an alternate gas density measuring structure with respect to the structure of Figure I. In this structure the gas sample chamber 10 is provided with an outlet pipe 12' and outlet valve 40', diagonally opposite the sample chamber inlet pipe 11. Thus the sample gas is travelled across the chamber 10 as well as through it. The Figure V structure further illustrates an alternate form of gas inlet to the centrifugal impeller disc unit 13. In this case a direct opening passage 15' is provided between the impeller central passage portion 15 and the chamber 10. The lower end of the depending sleeve 22 in this case rotates on a sealing sleeve 30' as a fixed bearing surface. The sealing sleeve 30' is fixed to the plug 30 and lies between the sleeve 22 and the pressure take-off sleeve 32 to isolate the chamber (10) pressure with respect to the take-off pressure in the pressure take-off sleeve 32.

The structure of Figure V is further intended to illustrate density measurement of a "static," finite body of gas, for example for measurement of gas under laboratory conditions. In such a case the outlet valve 40' is closed, the gas sample is introduced through the inlet pipe 11, and the inlet valve 41 then closed. Thereafter, the centrifugal impeller is rotated and the density representative differential pressure measurement made in a suitable manner, such as that illustrated and hereinbefore described.

This invention, therefore, provides a new and improved device for measuring the density of fluids. It further provides such a device in association with flow measuring apparatus.

As many embodiments may be made of the above invention, and as changes may be made in the embodiments set forth above, without departing from the scope of the invention, it is to be understood that all matter hereinbefore set forth or shown in the accompanying drawings is to be interpreted as illustrative only and not in a limiting sense.

I claim:

A gas density measurement system wherein a density representative differential pressure is established by passing a body of gas through a centrifugal impeller, said system comprising, in combination, a vertically cylindrical, closed end main housing, a main gas supply pipe opening into the bottom of said housing and a gas outlet pipe opening from the top portion of said housing as a continuous gas flow arrangement through said housing, an electric motor mounted on the top of said housing in sealed relation therewith, a drive shaft from said motor extending down through the top of said housing, a circular centrifugal disc unit mounted on the lower end of said shaft for rotation in said housing, by said motor, said disc unit having a series of wheel-spoke radial centrifugal passages therein, uniformly disposed around said disc with a central disc opening common to all of said passages and with the outer ends of said radial passages open to the interior of said housing in the curved peripheral form of said disc, a first cylindrical sleeve vertically disposed with its top end secured and sealed to the under side of said disc as a downward continuance of said central disc opening, said first sleeve extending downward and through an opening in the bottom wall of said main housing, a telescoped assembly comprising a second sleeve mounted concentrically within a third sleeve, said telescoped assembly extending vertically up through said bottom wall opening of said main housing and fixedly secured to said housing in sealed relation therewith, with said second sleeve top terminating adjacent and open to said central disc opening, with said first sleeve concentrically telescoped in said telescoped assembly and lying between said second sleeve and said third sleeve, a plug in said telescoped assembly outside of said main housing and forming a bottoming seal between said third sleeve and said second sleeve under the lower end of said first sleeve, a mercury supply tank and a mercury inlet pipe open to said third sleeve on a gravity feed basis to establish a predetermined mercury level between said third sleeve and said first sleeve and between said first sleeve and said second sleeve, whereby gas may be introduced to the center of said centrifugal disc from outside said main housing, through a fixed pipe and while said centrifugal disc is rotating, in a sealed gas passage arrangement with respect to the interior of said main housing, a sample gas supply pipe connected from said main gas supply pipe outside of said housing and extending into said telescoped assembly through said bottoming plug, up inside said second sleeve and terminating above the top end of said second sleeve and closely adjacent said central opening of said centrifugal disc, for introducing sample gas into said disc for centrifugal expulsion through said radial passages of said disc to the interior of said main housing, and a differential pressure sensing device having one pressure connection to the interior of said main housing at the lower end portion thereof and an opposing pressure connection to the lower end of said second sleeve of said telescoped assembly.

References Cited in the file of this patent
UNITED STATES PATENTS

| | | |
|---|---|---|
| 1,677,835 | Linderman | July 17, 1928 |
| 2,035,039 | Adams et al. | Mar. 25, 1936 |
| 2,484,207 | Criner et al. | Oct. 11, 1949 |

OTHER REFERENCES

Journal of Scientific Instruments, vol. 22, Aug. 1945, Centrifugal Gas Specific Gravity Meter—Dowling, pages 145, 146.